March 24, 1936.     R. K. LEE     2,034,764
MOTOR MOUNTING
Filed Nov. 25, 1932     3 Sheets-Sheet 1

INVENTOR.
ROGER K. LEE.
BY
ATTORNEYS.

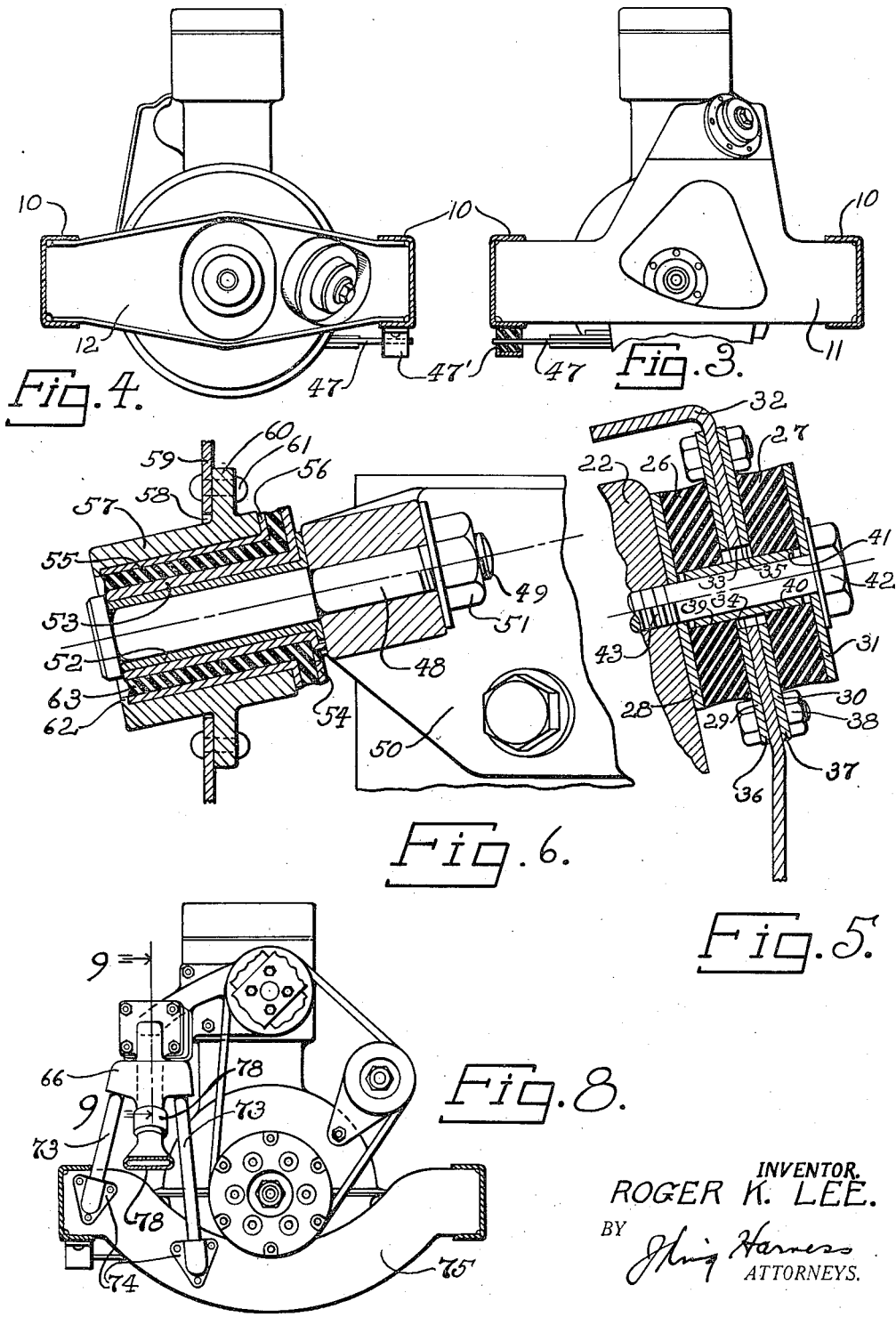

Patented Mar. 24, 1936

2,034,764

UNITED STATES PATENT OFFICE 2,034,764

MOTOR MOUNTING

Roger K. Lee, Highland Park, Mich., assignor to Chrysler Corporation, Detroit, Mich., a corporation of Delaware Application November 25, 1932, Serial No. 644,336

29 Claims. (Cl. 248—7)

This invention relates to improved mountings for reciprocating piston type engines such as internal combustion engines, for use in propelling vehicles, and it has particular relation to a novel form and arrangement of mounting members which permit a limited amount of movement of the engine.

More specifically, the invention provides an improved engine unit mounting in which the various mounting members may be spaced laterally from the central portions of the front and rear ends of the unit which are generally congested by reason of the necessity of locating a number of elements and devices of the unit in the central region of the front and rear ends thereof.

One of the main objects of the invention is to provide a mounting of this kind having mounting members which may be located in uncongested regions of the unit and which can be accurately spaced with respect to each other so that the oscillatory movement of the unit will occur about an axis passing through one or more predetermined locations in the unit, such as the center of mass of the unit and the center of force of the engine.

Another object of the invention is to guard against the application of severe shock and vibration upon the chassis frame of a vehicle, or or other structure on which a power plant unit of this character is mounted, by the internal forces of the engine which are prevalent at the location in the engine known as the center of vibration forces.

Another object of the invention is to provide means for mounting a power plant unit of this character which are constructed and arranged in such a manner as to bring the frequency with which the unit naturally tends to vibrate in the direction it is urged by the forces applied at the center of vibration forces, below the frequency of such forces at the idling and lower end of the driving range of the engine.

Other objects of the invention are to provide mounting members which are also constructed and arranged so as to permit oscillation of a power plant unit, having an internal combustion engine, under the influence of the torque reaction impulses of the engine without producing substantial displacement of the center of mass of the unit; and to provide means for establishing the natural vibration frequency of the unit, about the axis with respect to which it is oscillated by the torque reaction impulses, at a lower value than the frequency of the torque reaction impulses at the lower end of the driving range of the engine.

Further objects of the invention are to provide mounting members having resilient weight supporting elements that are adapted to yieldably oppose displacement of the unit under the forces which tend to move it relative to its supporting frame structure; to provide adjustable means for predetermining the compression of the resilient elements so as to establish their rates at the values required to bring the natural vibration frequency of the unit upon its mounting to a desired standard and to predetermine the opposition to oscillatory or other movements of the unit; to provide a passage in one of the mounting members through which cooling medium may be supplied to the cooling medium chamber of the engine, and to provide a mounting member of this character which may be conveniently located at the cooling medium inlet of an engine without interfering with the supply of cooling medium thereto when it is necessary to so locate the mounting member in order to bring the axis of oscillation of the unit through the desired locations therein.

An illustrative embodiment of the invention is shown in the accompanying drawings, in which:

Fig. 3 is an elevational view, partly in perspective, of the rear end of the unit and its mounting.

Fig. 4 is an elevational view, partly in perspective, of the front end of the unit and its mounting.

Fig. 5 is an enlarged, fragmentary sectional view of a mounting member embodying my invention.

Fig. 6 is an enlarged fragmentary sectional view of a modified form of mounting member which is adapted to replace one or all of the mounting members illustrated in Fig. 1.

Fig. 8 is a front end view, partly in section and partly in elevation, of the mounting shown in Fig. 7.

Figure 1:
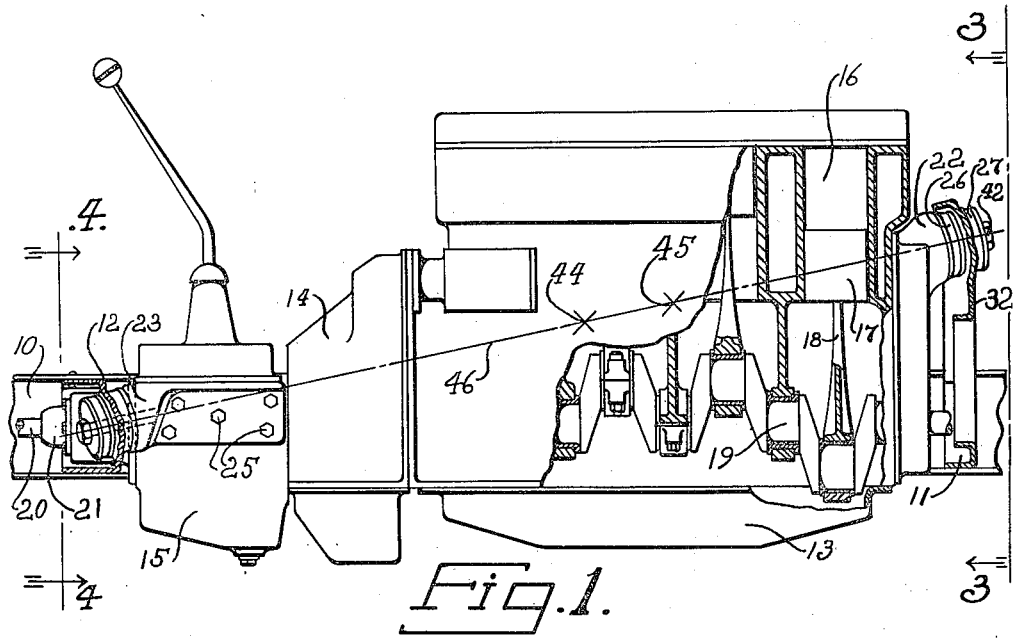
Fig. 1 is a side view, partly in elevation and partly in section, of a power plant unit mounted according to my invention in a chassis frame of a vehicle.

In the form shown in Figs. 1 to 5, inclusive, the improved power plant mounting is illustrated in conjunction with a vehicle chassis frame which includes longitudinally extending channel members 10 and rigid transversely disposed front and rear members 11 and 12, respectively, which are secured to the longitudinal channel members by rivets or other suitable means. The transverse frame member 11 is located at the front end of the vehicle chassis frame and the transverse member 12 is spaced rearwardly therefrom a distance slightly greater than the over-all length of the power plant unit which includes an internal combustion engine having a crankcase 13, clutch and transmission housings 14 and 15, respectively, which are rigidly fixed together and to the crankcase in longitudinal alignment therewith.

The internal combustion engine is of the multiple cylinder type having aligned cylinders 16, only one of which is shown. Slidably mounted in each cylinder is a reciprocating piston 17 to which is pivotally attached a connecting rod 18, which is journaled at its lower end to a crankshaft 19 in the usual manner. A clutch mechanism (not shown) within the clutch housing 14 connects the crankshaft 19 with a transmission mechanism (not shown) within the housing 15 in a conventional manner and the transmission mechanism in turn drives the propeller shaft 20 through a universal joint 21.

Figure 2:
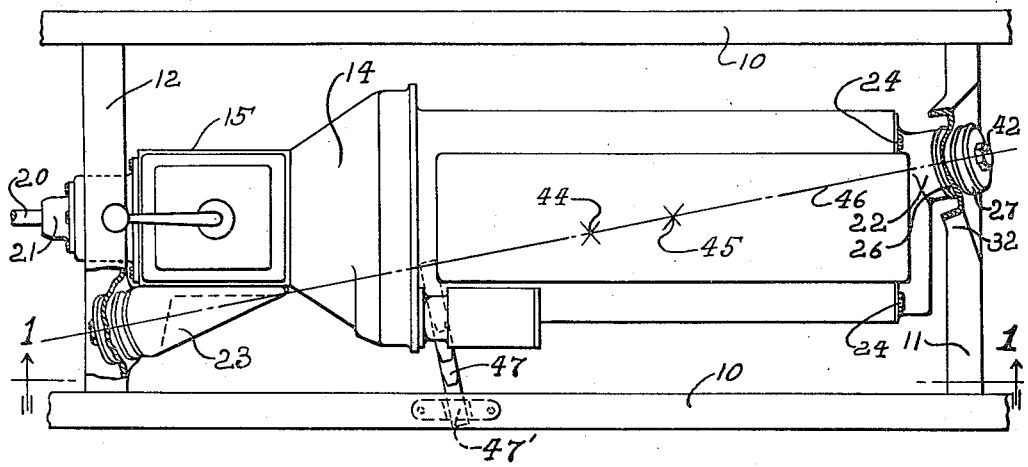
Fig. 2 is a plan view of the unit illustrated in Fig. 1 showing the mounting thereof partly in section.

Provided on the front end of the crankcase 13 and rear end of the transmission housing 15 are aligned forwardly and rearwardly protruding brackets 22 and 23, respectively. These brackets, as illustrated in Fig. 1, extend at an inclination to the horizontal plane of the axis of the crankshaft and, as illustrated in Fig. 2, they extend at an inclination to the vertical plane of the crankshaft axis. The front bracket 22 may be formed integral with the crankcase 13 or it may be detachably fixed thereto by bolts 24 or other suitable means. The rear bracket 23 is secured to the side of the transmission housing 15 by bolts 25, but this bracket may, if desired, be formed integral with the transmission housing.

The front and rear brackets 22 and 23 are oscillatively attached to the rear transverse member 12 and to an upright support 32 on the front transverse member 11, respectively, by mounting members, each of which includes a pair of rubber elements 26 and 27. The rubber element 26 is disposed between a pair of metal plates 28 and 29, to which its opposite sides are rigidly fixed, preferably by vulcanization, and the rubber element 27 is disposed between a pair of metal plates 30 and 31 and rigidly fixed thereto, preferably in the same manner. In the form shown, the rubber elements and the plates to which they are fixed, are of circular shape but they may be of any contour desired or required to enable convenient installation.

One of the rubber elements and its associated plates are located on each side of the upright support 32 which is provided with an aperture 33 which registers with apertures 34 and 35 in the plates 29 and 30. The latter plates are provided with apertured ears 36 and 37 for receiving bolts 38 by which the plates are rigidly secured to the upright support 32. The rubber elements 26 and 27 are provided with central registering apertures 39 and 40 of a somewhat smaller diameter than the apertures 33, 34, and 35, in which a bushing 41 is received. The ends of the bushing 41 extend to within close proximity of the adjacent sides of the outer plates 28 and 31 of the mounting member, as illustrated in Fig. 5. A bolt 42 passes through the bushing 41 and through registering apertures in the outer plates 28 and 31 which are of substantially the same diameter as the inner diameter of the bushing 41. The bolt 42 of the front mounting member is threaded in an aperture 43 of the front bracket 22 and a corresponding bolt of the rear mounting member, which is secured to the rear transverse frame member 12 in the above manner, is threaded in a similar aperture formed in the rear bracket 23.

The mounting members are constructed and arranged in such a manner that the oscillatory movement of the unit occurs about an axis indicated at 46, which passes substantially through the center of mass of the unit, diagrammatically illustrated at 44, and through the center of vibration forces, diagrammatically illustrated at 45 in Figs. 1 and 2. The location of the center of vibration forces, sometimes called the center of force, varies in diverse engines. It may be determined by locating the combined center of gravity of the reciprocating parts which is the point of application of the resultant force due to motion of such parts. It is located substantially midway between the middle pair of cylinders of an engine having a crankshaft, such as that shown in Fig. 1, which is symmetrical longitudinally with respect to its central bearing.

The internal forces of an engine unit which tend to produce the vibrations that this particular dispositioning of the axis eliminates are caused by the inertia of the moving parts of the engine and in a four cylinder engine they are known as the secondary forces. The location at which the secondary forces of a four cylinder engine are manifested is set forth in "The Gasoline Automobile" by Heldt, volume 1, seventh edition, pages 73, 74 and may also be determined in an engine by operation of the latter while freely suspended from springs and unrestrained by external attachment, the point in the engine unit about which vibration occurs under these conditions being the center of vibration forces.

The secondary forces in a four-cylinder engine occur at this location and they are applied in the direction in which its pistons reciprocate. In a conventional four-cylinder engine unit having vertically disposed cylinders, the secondary forces tend to move the unit vertically. By attaching the engine unit to the frame at spaced points subsantially in alignment with the location at which the secondary forces are applied, oscillation of the engine unit about its axis under the influence of the secondary forces is eliminated, and as a result a reduction is brought about in the shock and vibration applied on the frame and other structure associated with the unit.

Mounting members of the type illustrated are particularly advantageous in mounting a power unit so that its oscillatory movement will occur about an axis extending through one or more selected locations in the unit because they may be accurately placed with respect to each other at locations which are spaced laterally from the central congested end portions of the unit.

The rubber elements 26 and 27 of the mounting members support substantially the entire weight of the unit and, by reason of their attachment to the unit and to the frame structure of the chassis, they yieldably oppose oscillatory movement of the unit under the influence of the torque reaction impulses of the engine. The character or rate of the mounting members may be varied by manipulation of the bolts 42 so as to bring the frequency at which the unit tends to vibrate in the directions it is urged by the forces applied at the center of vibration forces, below the frequency of such forces at the idling or lower end of the driving range of the engine. In this manner, the frequency of the forces applied at the center of vibration forces is prevented from synchronizing with, or occurring in phased relation with the frequency at which the unit naturally tends to vibrate upon its mountings in such direction and as a result vibration periods which have heretofore been found to be objectionable during idling operation of a vehicle engine are effectively guarded against. By bringing the axis with respect to which the unit is oscillated through the center of vibration forces, the forces applied at this location are prevented from augmenting the oscillatory movement of the unit about the axis 46 which is caused by the torque reaction impulses. As the axis 46 also passes substantially through the center of mass of the unit, the latter may oscillate under the influence of the forces to which it is subjected without producing substantial displacement of the center of mass of the unit, and for this reason the shock and vibration applied upon the supporting structure, such as the chassis frame of a vehicle, is materially reduced.

The rubber elements of the mounting members are called upon to accomplish other definite functions, such as supporting the weight of the engine and limiting its movement within a predetermined desired range, respectively. Therefore, they cannot also always be provided with those properties which are required to bring the frequency at which the unit naturally tends to vibrate in an oscillatory manner about the axis 46, below the frequency of the torque reaction impulses at the lower end of the driving range of the engine. When this condition exists, the natural vibration frequency of the engine is predetermined by allowing a resilient member to coact between the unit and the chassis frame. In the illustration shown, a leaf spring 47, shown in Fig. 2, is fixed at one end to the lower side of the unit and preferably yieldably attached at its outer end to one of the longitudinal side members of the chassis frame by a rubber block 47' which is fixed to the chassis frame and which has a recess for receiving the outer end of the leaf spring. The leaves of the spring are arranged so as to build up greater resistance to counter-clockwise rotation of the unit, as viewed from the right in Fig. 2, than to clockwise rotation thereof, as the torque impulses tend to rotate the engine in a counter-clockwise direction. By properly predetermining the rate of the leaf spring, the natural vibration frequency of the unit with respect to the axis 46 may be brought to a lower value than the frequency of the torque reaction impulses at the lower end of the driving range of the engine, and in this way the creation of severe shock and vibration due to synchronizing of the torque reaction impulses with the natural vibration frequency of the unit is effectively guarded against.

The mounting member shown in Fig. 6 illustrates a further development of my invention and may, if desired, be used in place of either one or both of the mounting members shown in Figs. 1 to 5, inclusive. In this form of the invention, a pair of trunnions 48 are provided on the respectively opposite ends of the power plant unit and arranged so as to have their axes substantially coincident with an axis extending through the center of mass of the unit and through the center of vibration forces of the engine. The trunnion 48 is provided with a threaded end portion 49 by which it is detachably securable to a bracket 50 by means of a nut 51. The trunnion 48 is received in a bushing 52 which is non-rotatably fixed to a metal sleeve 53 having a radial flange 54 on one end thereof. The metal sleeve 53 is mounted within an outer metal sleeve 55 having a radial flange 56 spaced from the flange 54 of the inner sleeve. The outer sleeve 55 is received in a tubular member 57 which extends through an aperture 58 of a transverse member 59 of the frame structure corresponding to either the upright front support 32, or the rear transverse member 12 embodied in the form of my invention shown in Figs. 1 to 5, inclusive. The tubular member 58 is provided with an integral flange 60 which is disposed adjacent the transverse member 59 and rigidly secured thereto by rivets 61, or other suitable means. Formed on the lower end of the tubular member 57 is an inwardly extending flange 62 which engages the left extremity of the outer sleeve 55. The radial flange 56 of the outer sleeve 55 abuts against the right extremity of the tubular member 57.

Provided between the inner and outer sleeves 53 and 55 and the radial flanges 54 and 56 thereof, respectively, is a layer of rubber 63 which is rigidly secured to the adjacent peripheries of the sleeves and faces of the flanges, preferably by vulcanization. That portion of rubber 63 which is disposed between the sleeves 53 and 55 yieldably supports a portion of the weight of the power plant unit under compression and it yieldably constrains the unit against upward and lateral movement while that portion of the rubber which is disposed between the flanges also aids in supporting the weight of the unit under compression, and in addition, it yieldably holds the unit against movement in the general direction of its length.

Figure 7:
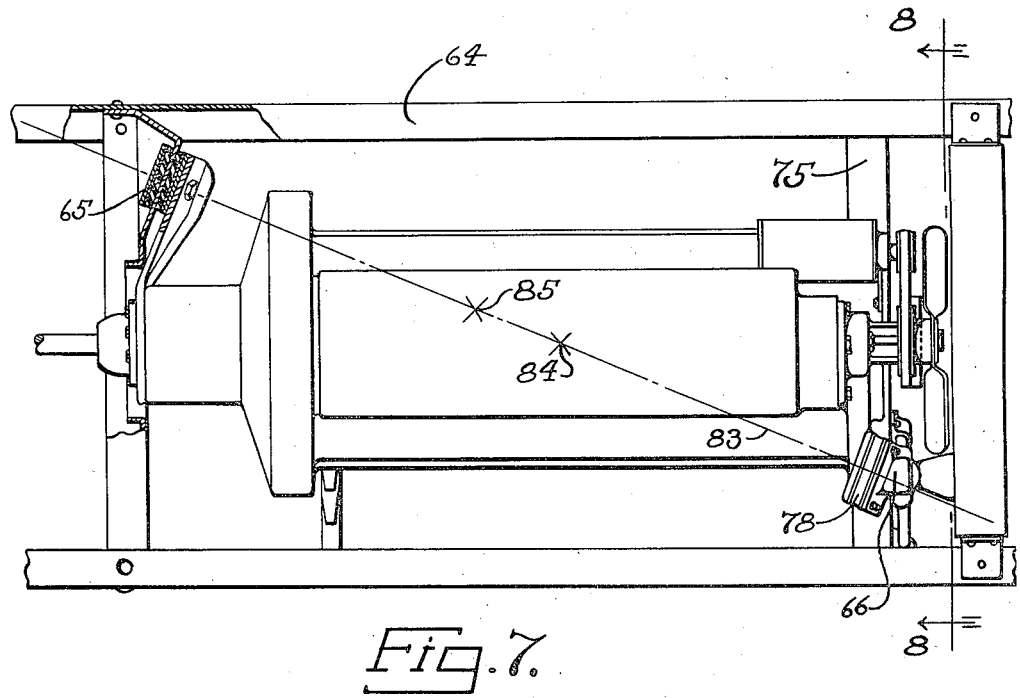
Fig. 7 is a plan view, similar to Fig. 2, but showing a further development of the invention.
Figure 9:
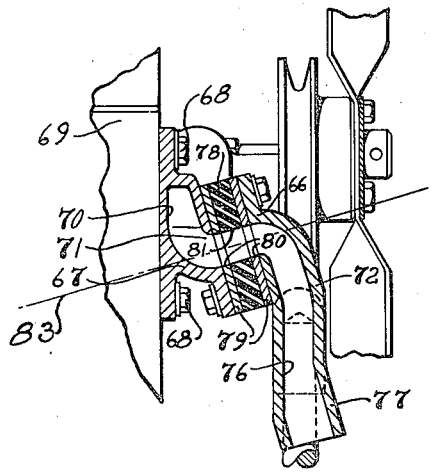
Fig. 9 is a rear end view, partly in section and partly in elevation, of the mounting shown in Fig. 7.

In the form of my invention shown in Figs. 7, 8, and 9, the rear end of the power plant unit is mounted on a chassis frame 64 by a mounting member 65 which is of substantially the same construction as the rear end support shown in the form of my invention disclosed in Figs. 1, 2, 3, and 5, and illustrated somewhat in detail in Fig. 5. The front end of the power plant until is oscillatively supported by a mounting member 66 which is provided with a passage for conducting cooling medium to the cooling medium chamber of the engine. This mounting member includes a bracket 67 which is rigidly fixed by bolts 68 to the front end of the cylinder block 69 of the power plant unit. The bracket 67 is provided with an internal passage 70 having an inlet 71 at its front side and an outlet (not shown) which communicates with the cooling medium chamber of the engine. The front mounting member also includes a bracket 72 which is provided with downwardly extending posts 73. The lower ends of the posts 73 are received and fixed in sockets formed in brackets 74 which are rigidly secured to a front cross member 75 of the chassis frame. Formed in the bracket 72 of the front mounting member is a cooling medium passage 76 which registers with the inlet 71 of the passage 70 in the bracket 67. The passage 76 extends through a downwardly projecting neck portion 77 of the bracket 72 which is adapted to receive a flexible hose 78 of the type conventionally used for connecting a radiator of a motor vehicle with the cooling medium chamber of the engine thereof.

The brackets 67 and 72 of the front mounting member are oscillatively connected together by means of a layer of rubber 78 and a pair of metal attaching plates 79. The attaching plates 79 are rigidly bonded, preferably by vulcanization, to the opposite sides of the rubber layer 78 and one plate is rigidly fixed to each of the brackets by bolts or other suitable means. Formed in the central portions of the attaching plates and rubber layer are registering apertures 80 and 81 respectively which communicate with the upper and lower ends of the passages 70 and 76 in the brackets 67 and 72, respectively. The apertures 80 and 81 are preferably or substantially concentric with or located in close proximity to the axis about which one of the brackets of the front mounting member is permitted to oscillate relative to the other bracket.

The front and rear mounting members 66 and 65, respectively, are constructed and arranged so that the axis 83, with respect to which the power plant unit is oscillated under the influence of the forces inherent during its operation, extends substantially through the center of vibration forces of the engine, diagrammatically illustrated at 84 in Fig. 7, and through the center of mass of the unit, diagrammatically illustrated by the numeral 86. The axis 83, illustrated in Fig. 7, extends at an inclination to the front vertical plane of the unit which is opposite to the inclination of the axis 40 shown in Fig. 2, to the front vertical plane of the unit shown therein. The position of this axis depends upon the relation of the center of vibration forces and the center of mass with respect to each other. In many instances, the relative positions are such that extreme difficulty is encountered in arranging the mounting member in such a manner as to cause the oscillation of the power unit to occur about the axis they define without interfering with the supplying of cooling medium to the cooling medium chamber of the engine. A front mounting member of the type illustrated in Figs. 7 to 9, inclusive, which serves as a portion of the cooling medium conduit and which eliminates the necessity of employing a flexible hose for the purpose of conveying cooling medium to the engine, overcomes these difficulties while at the same time permitting the attainment of all the advantages set forth in the discussion of the first mentioned forms of my invention.

Although but one specific embodiment of the invention is herein shown and described, it will be understood that various changes in the size, shape, and arrangement of parts may be made without departing from the spirit of my invention, and it is not my intention to limit its scope other than by the terms of the appended claims.

What I claim is:

1. The combination of an internal combustion engine unit including a crankshaft and having its mass asymmetrically distributed with respect thereto, a supporting structure, and members coacting between said structure and unit to support the latter and so constructed and arranged that the axis of oscillatory movement of the unit substantially coincides with an axis extending through the center of mass and the center of force of the engine unit.

2. The combination of an internal combustion engine unit having a crankshaft, supporting structure, and means for mounting said unit on said supporting structure so constructed and arranged as to mount said engine unit for oscillation about an axis extending substantially through the center of mass and center of force of said engine unit and at an inclination to the axis of said crankshaft.

3. The combination of a frame, a power plant unit including an internal combustion engine having a plurality of in-line cylinders, and a mounting for said unit comprising a plurality of resilient members carried by the frame and engaged by said unit, said members being of such character and so located that the axis of oscillation of said unit passes substantially through the center of mass thereof and substantially through the center of force of said engine and the unit is permitted a limited oscillation about such axis.

4. The combination of a frame, a power plant unit including an internal combustion engine having a crankshaft and a mounting for said unit comprising a plurality of members carried by the frame and engaged by said unit, said members being of such character and so arranged that the axis of oscillation of said unit is spaced from said crankshaft and passes substantially through the center of mass thereof and substantially through the center of force of said engine and the unit is permitted a limited oscillation about such axis, at least one of said members being resilient.

5. In a vehicle including a chassis frame and a main drive shaft, the combination of an internal combustion engine unit having a crankshaft connected with said main drive shaft and having its mass asymmetrically distributed with respect to said crankshaft, and means on said frame including rubber members mounting said engine unit and so constructed and arranged as to provide for oscillation thereof about an axis extending substantially through the center of mass and the center of force of said engine unit so as to permit oscillation thereof about said axis under the influence of the torque reactions developed in rotating said main drive shaft against a load.

6. The combination of a power plant unit including an internal combustion engine, a supporting structure, members carried by and secured to said supporting structure and secured to said unit at diagonally opposite regions thereof and arranged substantially in alignment with the center of mass thereof and with the center of vibration forces of said engine so as to mount said unit for oscillation about an axis extending diagonally of said unit and passing substantially through the center of mass thereof and through the center of vibration forces of said engine.

7. The combination of a power plant unit including an internal combustion engine, having aligned cylinders and a crankshaft, a supporting structure, and members each having relatively oscillatable parts secured to said supporting structure and secured to said unit respectively at diagonally opposite regions thereof and each having an intermediate rubber element between the relatively oscillatable parts thereof for oscillatively supporting said unit, the axes of the relatively oscillatable parts of said members being substantially aligned with the center of mass of said unit and the center of vibration forces of said engine and misaligned with said crankshaft.

8. In a vehicle including a chassis frame, the combination with a power unit having an internal combustion engine and including rigidly connected longitudinally aligned engine crankcase, clutch and transmission housings, and a pair of members on said chassis frame for mounting said unit for oscillation relative thereto, each of said members having a part secured to the opposite ends of said crankcase and transmission housing respectively and a second part secured to said chassis frame, said members being so constructed and arranged as to bring the axis of oscillation of said unit substantially through the center of mass thereof and substantially through the center of vibration forces of said engine.

9. In a vehicle including a chassis frame having transverse supports, a power plant disposed between said supports including an internal combustion engine, members for oscillatively supporting said unit, each including a rubber element having one side fixed to said unit and another side fixed on one of said transverse supports respectively and arranged with respect to said transverse supports and power plant so as to carry the weight of said unit under tension, said members being so constructed and arranged as to bring the axis of oscillation of said unit substantially through the center of mass thereof and substantially through the center of vibration forces of said engine.

10. In a vehicle including a chassis frame having transverse supports, a power plant disposed between said supports including an internal combustion engine, members for oscillatively supporting said unit, at least one of said members having a resilient element fixed to said unit and to one of said transverse supports and arranged with respect to said transverse supports and power plant so as to carry a portion of the weight of said unit under tension; said members being so constructed and arranged as to bring the axis of the oscillatory movement of said engine substantially through the center of mass of said unit and substantially through the center of vibration forces of said engine.

11. The combination of a power plant unit including an internal combustion engine having aligned cylinders and a crankshaft, a supporting structure, a pair of bearing members mounted on said supporting structure, a pair of trunnions on said unit each journaled in one of said bearing members and each having its axis substantially coincident with an axis extending at an inclination to said crankshaft through the center of mass of said unit and the center of vibration forces of said engine so as to mount said unit for oscillatory movement about the latter axis, and means for resiliently opposing such oscillatory movement.

12. The combination of a power plant unit including an internal combustion engine having a crankshaft, a supporting structure, spaced trunnions on said unit having their axes substantially coincident with an axis extending at an inclination to the axis of said crankshaft through the center of mass of said unit and through the center of vibration forces of said engine, and a pair of members on said supporting structure for oscillatively supporting said unit each having a journal bearing for receiving one of said trunnions and a rubber element interposed between said journal bearing and said supporting structure for yieldably carrying the weight of said engine.

13. The combination of an internal combustion engine unit having a crankshaft, a supporting structure, and members coacting between said structure and unit to support the latter and so constructed and arranged that the axis of oscillatory movement of the unit substantially coincides with an axis spaced from said crankshaft and extending through the center of the vibration forces of said engine unit.

14. The combination of a frame, a power plant unit including an internal combustion engine having a plurality of in-line cylinders and having a crankshaft, and a mounting for said unit comprising a plurality of resilient members carried by the frame and engaged by said unit, said members being of such character and so located that the axis of oscillation of said unit is spaced from said crankshaft and passes substantially through the center of the vibration forces of said engine and the unit is permitted a limited oscillation about such axis.

15. The combination of a frame, a power plant unit including an internal combustion engine having a crankshaft and a mounting for said unit comprising a plurality of non-metallic, resilient members carried by said frame and engaged by said unit, said members being of such character and so located that the axis of oscillation of said unit extends at an inclination to the axes of said crankshaft and passes substantially through the center of the vibration forces of said engine and the engine is permitted resiliently resisted oscillation about such axis.

16. The combination of the power plant unit including an internal combustion engine having a cooling medium chamber provided with an opening, a supporting structure, mounting members for said unit including a plurality of resilient elements carried by said supporting structure and engaged by said unit, said members being so constructed and arranged that the axis of oscillation of said unit passes substantially through a predetermined location therein and the unit is permitted a limited oscillation about such axis, one of said mounting members having a passage communicating with the opening of said cooling medium chamber.

17. The combination of a power plant unit including an internal combustion engine having a cooling medium chamber provided with an inlet, a supporting structure, mounting members for said unit including a plurality of rubber elements each fixed to said supporting structure and unit respectively and so constructed and arranged that the axis of oscillation of said unit passes substantially through a predetermined location therein and the unit is permitted a limited oscillation about such axis, one of said members being provided with a passage extending through its rubber element in substantially concentric relation to said axis and communicating with said inlet.

18. The combination of a frame, a power unit including an internal combustion engine, and a mounting for said unit comprising a pair of oscillating mounting members located at diagonally opposite extremities of said unit and each having a rubber element so constructed and arranged as to maintain the respective axes of said mounting members in alignment with each other and at an inclination to the central horizontal and vertical planes of said unit.

19. The combination of a frame, a power plant unit including an internal combustion engine and a mounting for said unit comprising a pair of non-metallic resilient members coacting between said frame and diagonally opposite extremities of said unit, said members being of such character and so located that the axis of oscillation of said unit passes substantially through the center of mass thereof and the unit is permitted resiliently resisted oscillation about such axis.

20. The combination with an instrument subjected to vibrations and having a fluid chamber therein, a supporting structure, and weight sustaining mounting members oscillatively supporting said instrument on said structure, one of said mounting members including a non-metallic resilient fluid impervious element secured to said instrument and supporting structure and having a passage therethrough communicating with said fluid chamber.

21. The combination with an instrument subjected to vibrations and having a fluid chamber therein, a supporting structure, and weight sustaining mounting members oscillatively supporting said instrument on said structure, one of said mounting members including a yieldable element secured to said instrument and supporting structure respectively and having a passage therethrough communicating with said fluid chamber, the walls of said passage being impervious to fluid.

22. The combination with an instrument subjected to vibrations and having a fluid chamber therein, a supporting structure, and weight sustaining mounting members oscillatively supporting said instrument on said structure, one of said mounting members including rigid elements secured to said instrument and supporting structure respectively and an intermediate rubber element fixed to said rigid elements, said rigid elements and rubber element having registering passages communicating with said fluid chamber.

23. The combination of a frame, a power unit including an internal combustion engine, a mounting for said unit including at least a pair of oscillating mounting members located at diagonally opposite portions of said unit and so constructed and arranged as to maintain the respective axes thereof in alignment with each other and at an inclination to the central horizontal and vertical planes of said unit.

24. The combination of a frame, a power unit including an internal combustion engine, a mounting for said unit including at least a pair of oscillating mounting members located at diagonally opposite portions of said unit, each having journal and bearing portions coacting between said unit and frame, said pair of mounting members being so constructed and arranged as to maintain the respective axes of said journal portions in alignment with each other and at an inclination to the central horizontal and vertical planes of said unit.

25. The combination of a frame, a power unit including an internal combustion engine having aligned crankcase, clutch, and transmission housings, a mounting for said unit including an oscillating mounting member offset laterally in one direction from the center line of said unit and coacting between one end portion of said unit and said frame and including another oscillating mounting member offset laterally from said center line in an opposite direction and coacting between the other portion of said unit and said frame, said mounting members being so constructed and arranged as to maintain the respective axes in alignment with each other and at an inclination to the central horizontal and vertical planes of said unit.

26. In an engine power plant mounting for a motor vehicle having a frame, said power plant being subject to oscillation about a longitudinal axis extending at an angle to the driveshaft axis of the power plant under the action of forces inherent in its operation, means for mounting said power plant on said frame constructed and arranged to provide for said oscillatory movement about said axis in response to said forces, said mounting means including portions connected to the power plant forwardly and rearwardly thereof arranged at an inclination with respect to said driveshaft axis and substantially conforming with the inclination of said axis of oscillation.

27. In an engine power plant mounting for a motor vehicle having a frame, said power plant being subject to oscillation about a longitudinal axis extending at an angle to the driveshaft axis of the power plant under the action of forces inherent in its operation, means for mounting said power plant on said frame constructed and arranged to provide for said oscillatory movement about said axis in response to said forces, said mounting means including portions connected to the power plant forwardly and rearwardly thereof, one of said portions being arranged at an inclination with respect to said driveshaft axis and substantially conforming with the inclination of said axis of oscillation.

28. In an engine power plant mounting for a motor vehicle having a frame, said power plant being subject to oscillation about a longitudinal axis extending at an angle to the driveshaft axis of the power plant under the action of forces inherent in its operation, means for mounting said power plant on said frame constructed and arranged to provide for said oscillatory movement about said axis in response to said forces, said mounting means including portions connected to the power plant forwardly and rearwardly thereof arranged at an inclination with respect to said driveshaft axis and substantially conforming with the inclination of said axis of oscillation, and yielding means intermediate said frame and each of said portions.

29. In an engine power plant mounting for a motor vehicle having a frame, said power plant being subject to oscillation about a longitudinal axis extending at an angle to the drive shaft axis of the power plant under the action of forces inherent in its operation, means for mounting said power plant on said frame constructed and arranged to provide for said oscillatory movement about said axis in response to said forces, said mounting means including portions connected to the power plant forwardly and rearwardly thereof arranged at an inclination with respect to said driveshaft axis and substantially conforming with the inclination of said axis of oscillation, said portions lying substantially along said axis of oscillation.

ROGER K. LEE.